March 22, 1927. 1,621,622
L. BRENNEIS
DISK HARROW
Filed July 26, 1926 5 Sheets-Sheet 4
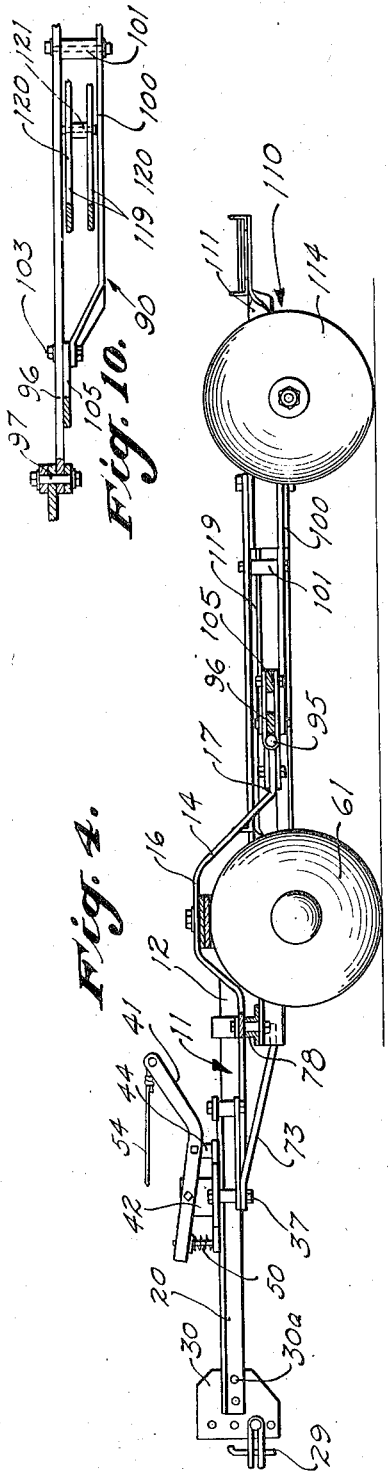
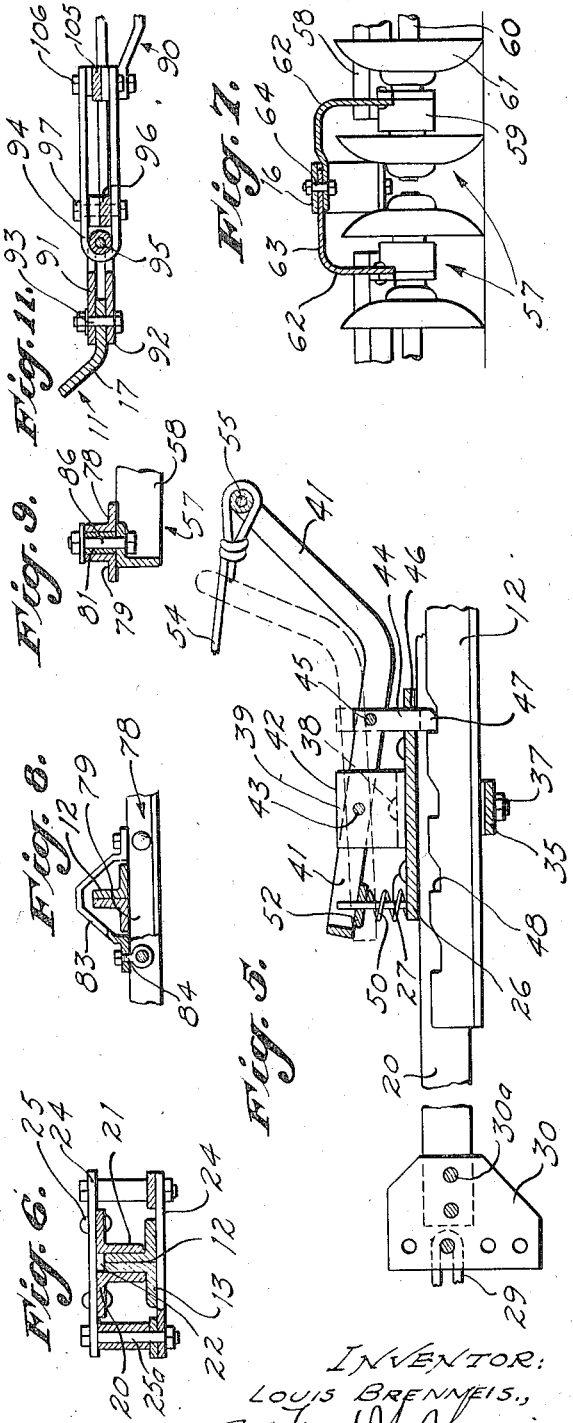
INVENTOR:
LOUIS BRENNEIS,
By Ford V. Harris
ATTORNEY.

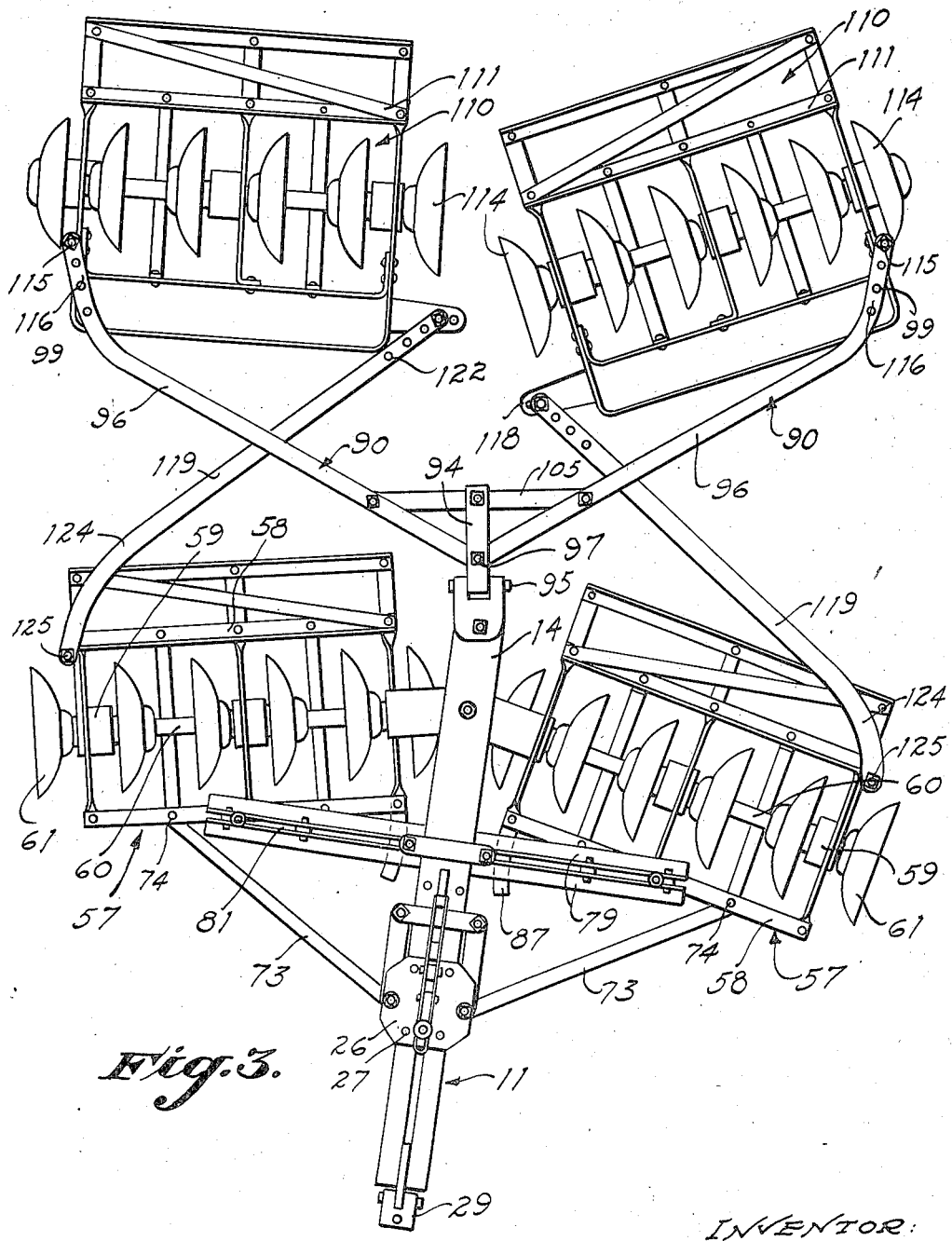

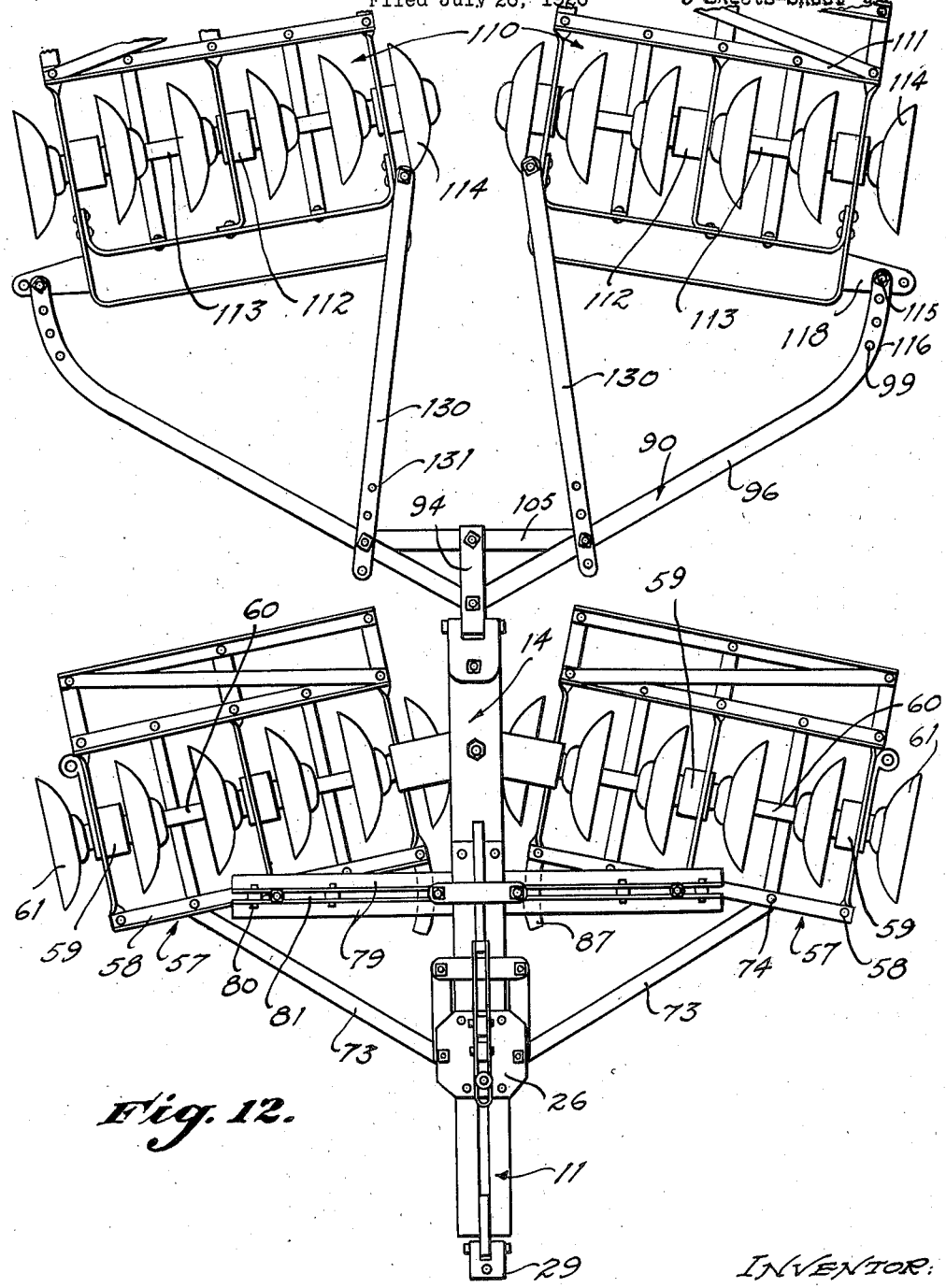

Patented Mar. 22, 1927.

1,621,622

UNITED STATES PATENT OFFICE.

LOUIS BRENNEIS, OF OXNARD, CALIFORNIA, ASSIGNOR TO BRENNEIS MANUFACTURING COMPANY, OF OXNARD, CALIFORNIA, A CORPORATION OF CALIFORNIA.

DISK HARROW.

Application filed July 26, 1926. Serial No. 124,856.

My invention relates to agricultural implements and particularly to a disk harrow. The common form of disk harrow has a main frame to which front gangs of disks are attached and a rear frame to which rear gangs of disks are attached. Means are provided for moving the gangs from non-working position in which the disks are parallel to the line of travel into working position in which the disks are non-parallel to the line of travel.

It is an object of this invention to provide a disk harrow having improved and simplified mechanism for moving the gangs from non-working position into working position and vice versa.

In the ordinary disk harrow the front gangs are adjusted in position by a means located at the front end of the harrow and the rear gangs are also adjusted in position by this same means. The attachment links or bars which extend from the rear gangs to the means at the front of the harrow often interfere with the front gangs, especially when the harrow is pulled through a curved path.

It is also an object of this invention to provide a disk harrow in which the positions of the rear gangs are controlled by the front gangs.

When a disk harrow is being pulled over the ground in working position some of the disks tend to dig deeper than some of the others, this resulting in the twisting of the frames on their pivots.

It is another object of this invention to provide a disk harrow which is so constructed that twisting and buckling of the various frames will be almost eliminated.

When a disk harrow is being pulled through a curved path the rear gangs are moved from their normal positions and certain of the disks thereof tend to dig deeply into the ground and place large twisting strains on the frames of the harrow.

A further object of this invention is to provide a disk harrow in which the rear gangs, while turning, are moved by the front gangs into positions in which the tendency of them to dig deeply is quite small.

It is very often necessary to harrow uneven or hilly ground. In the ordinary form of disk harrow the frames are made so that they cannot pivot on a horizontal plane and, therefore, when either the front or rear gangs are traveling over high spots the other of the gangs will be lifted from the proper engagement with the ground. This strains the frames and produces unsatisfactory harrowing of the ground.

It is a still further object of this invention to provide a harrow in which the main and rear frames are hinged together so that the disks of the front and rear gangs may at all times properly engage the ground when working on hilly or uneven contours.

And yet another object of this invention is to provide a disk harrow in which the parts may be arranged so that they will form a trench.

Other objects and advantages will be made evident hereinafter.

Referring to the drawings in which I illustrate a preferred embodiment of my invention, Fig. 1 is a plan view showing the gangs in non-working position.

Fig. 3 is a plan view showing the gangs in working position and the positions they occupy when the harrow is being pulled through a curved path.

Fig. 4 is a section taken on the line 4—4 of Fig. 1.

Fig. 5 is an enlarged fragmentary section showing a latch mechanism at the forward end of the harrow.

Fig. 6 is a section taken on the line 6—6 of Fig. 1.

Fig. 7 is a section taken on the line 7—7 of Fig. 1.

Fig. 8 is a section taken on the line 8—8 of Fig. 1.

Fig. 9 is a section taken on the line 9—9 of Fig. 1.

Fig. 10 is a section taken on the line 10—10 of Fig. 1.

Fig. 11 is an enlarged fragmentary section showing the attachment means for attaching a main and rear frame of the invention together.

Fig. 12 is a plan view of the disk harrow showing the parts arranged in trenching position.

Figure 1:
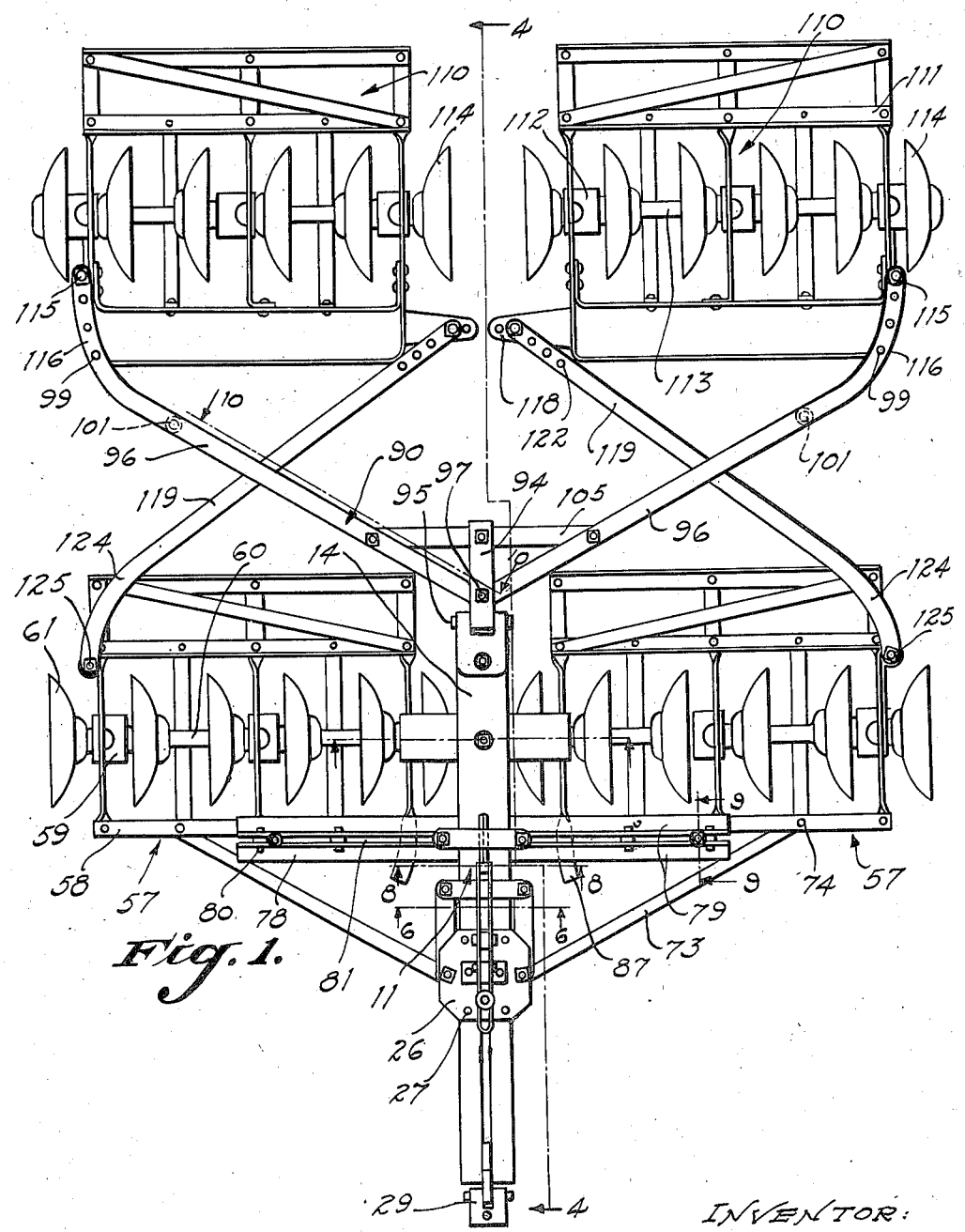

Referring to the drawings, the numeral 11 represents a main frame, the forward end of which is an inverted T 12 as shown.

The forward end 12 is preferably made of a pair of angles 13 which are arranged with their vertical legs in abutment so as to provide the T shape shown. The rearward part 14 is in the form of a flat bar which is secured to the T formation 12 in any suitable manner, such as by welding. The part 14 is arched upward at 16 and the rearward end 17 extends horizontally and in a slightly lower plane than the T formation 12. Carried at the forward end of the main frame 11 is a draft frame 20 having a pair of angle irons 21 which are arranged so as to provide a space 22 between adjacent vertical legs thereof, the vertical leg of the T formation 12 extending into the space 22. The angle irons 21 of the draft frame 20 are secured in the position shown by means of bars 24, the upper of which is secured to the forward end by rivets 25 and the lower of which extends immediately below the T formation 12. The upper and lower bars 24 are attached together by a bolting arrangement 25a as shown clearly in Fig. 6, a mounting plate 26 centrally secured to the angle irons 21 by means of rivets 27, and at the extreme forward end thereof by a connection clevis 29 which is secured to the angle irons 21 by means of a plate 30 which is secured in place by rivets 30a.

Secured to the mounting plate 26 is a bar 35 which extends under the front end of the main frame 11, this bar 35 being secured to the mounting plate 26 by bolts 37, the bars 24 and 35 permitting relative longitudinal movement but preventing a relative vertical movement therebetween.

In order to transfer a pull on the main frame 11 exerted upon the draft frame 20, I provide a latch mechanism as shown in Figs. 1, 4 and 5 of the drawing. Rivets 38 secure brackets 39 to the mounting plate 26. A latch bar 41 is pivoted to vertical legs 42 of the bracket 39 by a pivot bolt 43. A keeper 44 is pivoted at 45 to the latch bar 41 and extends downward through an opening 46 in the plate 26, the lower end 47 thereof being arranged for engagement with teeth 48 provided in the vertical legs of the T formation 11. A spring 50 surrounding a pin 51 is provided for retaining the latch bar 41 in such a position that the keeper 44 will engage one of the teeth 48 of the main frame 11, this spring engaging the upper face of the mounting plate 26 and a bar 52 situated at the forward end of the latch bar 41. The rearward end 53 of the latch bar 41 is upwardly curved and an actuating means in the form of a rope 54 is connected thereto, said rope extending around a pin 55 carried by the bar 41. When the tractor is pulling the harrow, the pull on the draft frame 20 is transferred to the main frame 11 through the keeper 44 by pulling upon the rope 54 which is arranged for convenient actuation from the drive seat of the tractor vehicle. The keeper 44 may be removed from engagement with one of the teeth 48 and a relative movement between the draft frame 20 and the main frame 11 will occur.

Figure 2:
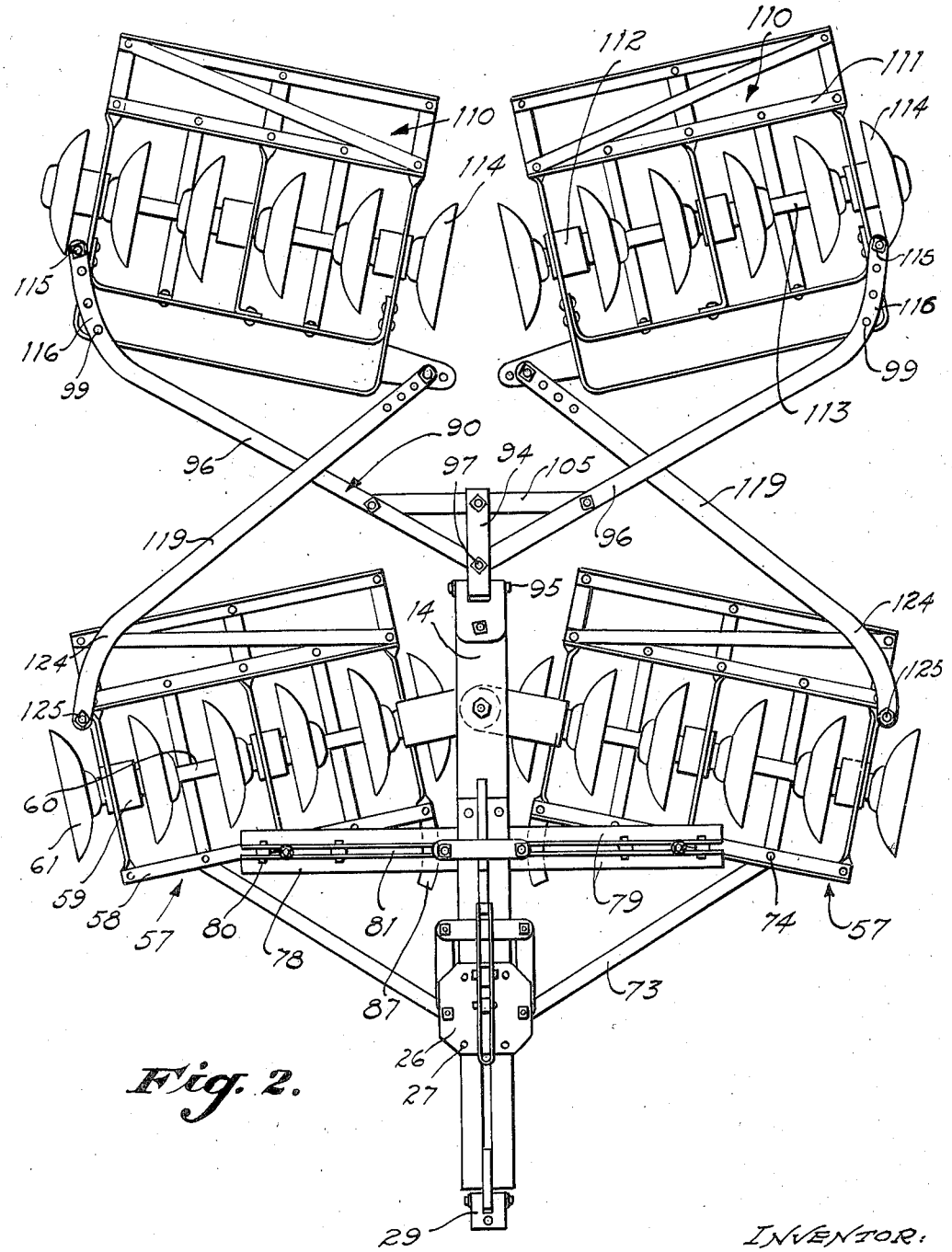
Fig. 2 is a plan view showing the gangs in working position.

Referring to Figs. 1, 2 or 3, front gangs 57 are pivoted to the main frame 11. The front gangs 57 are arranged on opposite sides of the rear part 14 of the main frame 11 as shown. Each front gang 57 has a front gang frame 58 to which bearings 59 are secured. The bearings 59 support a disk shaft 60 on which disks 61 are carried. Secured to the inner parts of each of the front gang frames 58, as illustrated best in Fig. 7, is a pivot arm 62. The inner ends of the horizontal portion 63 of the pivot arms 62 are pivotally attached to the arched portion 16 of the main frame 11 by means of a pivot bolt 64.

To prevent a free swinging of the front gang 57 on the pivot 64 and to retain them in a desired working or non-working position, I provide front links 73 which are pivotally attached at 74 to the front gang frames 58. The forward ends of the front links 73 are pivoted to the mounting plate 26 by means of the bolts 37 as shown in Fig. 4.

A stabilizing frame 78 is supported by the forward end 12 of the main frame 11, this stabilizing frame 78 being formed of a pair of angle irons 79 having adjacent legs thereof secured and spaced apart by means of bolts 80, thus providing a slot 81 therebetween. The angle irons 79, as shown in Fig. 8 of the drawing, extend below the forward portion of the main frame 11 and a yoke 83, which is secured to the stabilizing frame 78 by means of bolts 84, extends over the forward end of the main frame 11. The stabilizing frame 78 is arranged so as to be capable only of longitudinal movement along the main frame 11.

As shown in Fig. 9, pins 86 are secured to the frames 58 and extend through the outer ends of the slots 81 of the stabilizing member 78. There is a tendency for the front gang 57 to swing or twist vertically upon its central pivot, this resulting from a tendency for some of the disks 61 to penetrate the ground a greater distance than the others. By attaching the front gang frames 58 to the stabilizing frame 78, a twisting or buckling of the front gangs 57 is opposed. In order to assist the stabilizing frame 78 in opposing twisting and buckling, arms 87 are extended from the inner parts of the front gang frames 58, these arms engaging the lower face of the stabilizing frame 78.

Connected to the rear end of the main frame 11, is a pivoted frame or a rear frame 90. The rear frame 90 is attached to the main frame 11 by pivot means which is clearly shown in Figs. 1, 2, 3, 4 and 11. The pivot means includes a pivot member 91 which is bent into U-shape, the legs 92 thereof extending above and below the rearward end 17 of the main frame 11. The legs 92 are pivotally attached to the rearward end 17 by means of a pivot bolt 93. The rear frame 90 has a hinged strap 94 which extends around a hinged bolt 95 which is supported by the pivot member 91. The pivot member 91 is free to swing on a vertical axis and the rear frame 90 is free to swing on a horizontal axis.

The rear frame 90 has upper side bars 96 which are attached by means of a bolt 97 to the hinged strap 94. As illustrated in Figs. 1, 2 and 3 of the drawings, the upper side bars 96 extend diagonally outward and rearward from the bolt 97. The outer and rearward ends thereof are curved as indicated at 99.

Extending below the upper side bars 96 are lower side bars 100 which are spaced a distance therefrom by spacers 101. The rearward ends of the lower side bars 100 are curved the same as the upper side bars 96 and are in vertical alignment therewith. The forward ends of the lower side bars 100 are bent upward, as shown in Fig. 10, and are attached by bolts 103 to their respective upper side bars 96. The bolts 103 also connect a cross-brace bar 105 to the upper side bars 96, this brace bar 105, as shown in Fig. 11, being attached by a bolt 106 to the rearward part of the hinged strap 94.

Rear gangs 110 are pivotally attached to the rear ends of the rear frame 90, these rear gangs 110 being arranged on opposite sides of a center line of a disk harrow and in alignment with the front gangs. Each rear gang 110 has a rear gang frame 111 which supports bearings 112. Carried by the bearings 112 is a disk shaft 113 on which rear disks 114 are supported. The rear gang frames 111 are pivoted by bolts 115 to the rearward ends of the upper and lower side bars 96 and 100. These rearward ends are provided with a plurality of openings 116 so that the rear gang frames 111 may be pivoted thereto at different places.

Extending inward from the forward parts of the rear gang frames 111, are ears 118 to which the rearward ends of operating arms 119 are attached. The operating arms 119, as illustrated in Fig. 10, consist of upper and lower bars 120 which are suitably connected together by bolts 121. The rearward ends of the operating arms 119 are provided with a plurality of openings 122 so that the ears 118 may be connected thereto at different places. The forward ends of the operating arms 119 are slightly curved as indicated at 124. The extreme forward ends thereof are connected by pivot bolts 125 to the outer parts of the front gang frames 58 near the back parts thereof.

Adverting to Fig. 10, the operating arms 119 extend between the upper and lower side bars 96 and 100, this arrangement serving as a stabilizing means which will prevent the inner parts of the rear gangs 110 from vibrating vertically to any appreciable extent. This will prevent the rear gangs from twisting on their pivots 115.

The reader's attention is directed to the arrangement of the operating arms 119. These operating arms are connected at their front ends to the outer parts of the front gangs 57, and at their rearward ends to the inner parts of the rear gangs 110.

In Fig. 1, I show the harrow in non-working position. The front and rear gangs 57 and 110 are in such a position that the front and rear disks 61 and 114 are on planes parallel to the direction of motion of the harrow. When the harrow is drawn over the ground with the gangs in this position, there will be no cultivating action of the disks upon the surface of the ground.

Considering that the harrow is being drawn by a suitable tractor vehicle which may be attached to the harrow by means of the clevis connection 29 and that it is desirable to convert the harrow from non-working into working position, this is accomplished by pulling forwardly on the control rope 54 which results in the swinging of the latch bar 41 into dotted position, shown in Fig. 5, so that the keeper 44 is released from engagement with one of the teeth 48 of the main frame, as previously described. This permits a relative movement between the draft frame 20 and the main frame 11, thus permitting the draft frame 20 to move forward with respect to the main frame 11. When this occurs a forward pull is exerted on the front links, and front gangs 57 are swung from the positions shown in Fig. 1 into the positions shown in Fig. 2. At this time a forward pull is exerted on the operating arms 119 and the inner ends of the rear gangs 110 are pulled forward from the positions shown in Fig. 1 into the positions shown in Fig. 2. Fig. 2 represents the harrow in working position. When the gangs rest in the positions shown in this figure, the disks 61 and 114 are swung into planes at angles with the line of travel of the harrow. The disks dig into the ground over which they are operated and turn the earth.

When the front gangs 57 are swung into the position shown in Fig. 2 the pins 86 are moved forwardly and inwardly about their pivot 64, the pins 86 sliding inward in the slots 81 and moving the stabilizing frame forward with respect to the main frame 11. This is obvious from a comparison of Figs. 1 and 2. The steady arms 87 of the front frame 58, however, still engage the lower face of the stabilizer 78 and still serve to assist in preventing a twisting or buckling in the front gang structures. The operating arms 119, which extend between the upper and lower side bars 96 and 100 of the rear frame 90, are still restrained from a material vertical movement and therefore the rear gangs 110 are still prevented from twisting or buckling.

In Fig. 3 I show the disk harrow when it is being pulled through a curved path when the front and rear gangs 57 and 110 are in working positions. It should be noted that the main frame 11 and the front gangs 57 retain their normal respective positions, but the rear gangs 110 are moved from their normal working positions. The rear gang 110 on the right is swung into a position of less angularity with respect to the line of direction of the harrow, while the left is swung into a position of greater angularity. As previously mentioned there is a marked tendency for the rear gangs 110 to twist or buckle when the harrow is being pulled through a curved path. I have found that by controlling the positions of the rear gangs, by the operating arms which are arranged as shown, the tendency for rear gangs to dig and twist is reduced to a minimum. The left rear gang which is moved into considerable angle with respect to the line of direction of the harrow is fully braced since the rear frame extends quite close to the ear 118 to which the left operating arm 119 is pivoted. The swinging of the rear frame 90 on the pivot 93 assists in moving the rear frame close to the ear 118.

As shown in Fig. 5, the main frame 11 is provided with a series of teeth 48, this giving adjustability to the working position of the harrow as it is possible for the keeper to be selectively engaged with any of the teeth 48, thus limiting and varying the relative movement between the frames 11 and 20.

By hinging the rear frame 90 on a horizontal plane as shown best in Fig. 11, the harrow will operate as successfully on hilly ground as on flat ground. Each of the front and rear gangs may independently follow the contour of the ground without interference of the other of the gangs.

When it is desired to return the gangs from working position to non-working position, it is necessary to return the frames 11 and 20 to their original positions as illustrated in Fig. 1. This is accomplished by backing the tractor so that the draft frame 20 is moved rearward with respect to the main frame 11. This returns the front gangs 57 to their non-working positions and the rear gangs 110 are returned to their non-working positions by means of their operating arms 119.

As intimated in the foregoing part of this specification, it is sometimes desirable to provide trenches. My invention provides a disk harrow in which the front and rear gangs may be arranged so that the ground will not be harrowed but will be thrown to opposite sides so that a trench formation is provided. Referring to Fig. 12, the rear gangs must be arranged in the positions shown. The left rear gang is moved to the right side of the harrow and the right rear gang is moved to the left side of the harrow. The ears 118 are pivoted to the rear ends of the rear frame 90 as shown in Fig. 12. The operating arms 119 are disconnected and are not used at this time. In place of the operating arms 119, links 130 are utilized. The rear ends of the links 130 are pivoted to the ears 118 of the rear gangs and the forward ends of the links 130 are attached by the bolts 103 to the upper side bars 96. The forward ends of the links 130 are provided with a plurality of openings 131 so that they may be attached in different positions so that different angularities of the rear gangs may be had. When the harrow is arranged for digging trenches, the front and rear gangs are arranged in similar positions and the front and rear disks 61 and 114 are also arranged in similar positions. The action of the disks of the front and rear gangs causes the ground to be thrown outward. This will be obvious from an inspection of Fig. 12.

From the foregoing description it will be seen that the important object of the invention is to provide a disk harrow which has a novel means for moving the rear gangs 110 from working to non-working position and vice versa. The construction for accomplishing this is very important to the invention and consists namely of the operating arms 119 which are connected to the front and rear gangs, being attached to the outer parts of the front gangs and to the inner parts of the rear gangs.

Another important feature of the invention is that the front and rear gangs are adequately braced so that there will be a minimum of twisting and buckling. The front gangs are braced by means of the stabilizing frame 78 and steady arms 87, while the rear gangs 110 are braced by extending the operating arms 119 between the upper and lower side bars 96 and 100 of the rear frame 90.

A further important feature of the invention is the provision of the means which permits the harrow to be used for digging trenches.

I claim as my invention:

1. In a disk harrow, the combination of: a main frame; a rear frame pivoted to said main frame; front gangs pivoted to said main frame; rear gangs pivoted to said rear frame at their outer ends; means for changing the position of said front gangs; and operating bars each connected to one of said front gangs and one of said rear gangs for changing the positions of said rear gangs during a turning movement of said harrow so as to cause said rear gangs to trail substantially in the path followed by said front gangs.

2. In a disk harrow, the combination of: a main frame; a rear frame pivoted to said main frame; front gangs pivoted at their inner ends to said main frame; rear gangs pivoted at their outer ends to said rear frame; means for changing the position of said front gangs; and operating bars each connected to one of said front gangs and one of said rear gangs for changing the positions of said rear gangs.

3. In a disk harrow, the combination of: a main frame; a rear frame pivoted to said main frame; front gangs pivoted to said main frame; rear gangs pivoted to said rear frame; means for changing the position of said front gangs; and operating bars each connected to the outer part of one of said front gangs and to the inner part of one of said rear gangs for changing the positions of said rear gangs.

4. In a disk harrow, the combination of: a main frame; a rear frame pivoted to said main frame; front gangs pivoted at their inner ends to said main frame; rear gangs pivoted at their outer ends to said rear frame; means for changing the position of said front gangs; and operating bars each connected to the outer part of one of said front gangs and to the inner part of one of said rear gangs for changing the positions of said rear gangs.

5. In a disk harrow, the combination of: a main frame; a rear frame pivoted to said main frame; front gangs pivoted to said main frame; rear gangs pivoted to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to one of said front gangs and one of said rear gangs for changing the positions of said rear gangs.

6. In a disk harrow, the combination of: a main frame; a rear frame pivoted to said main frame; front gangs pivoted at their inner ends to said main frame; rear gangs pivoted at their outer ends to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to one of said front gangs and one of said rear gangs for changing the positions of said rear gangs.

7. In a disk harrow, the combination of: a main frame; a rear frame pivoted to said main frame; front gangs pivoted to said main frame; rear gangs pivoted to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to the outer part of one of said front gangs and to the inner part of one of said rear gangs for changing the positions of said rear gangs.

8. In a disk harrow, the combination of: a main frame; a rear frame pivoted to said main frame; front gangs pivoted at their inner ends to said main frame; rear gangs pivoted at their outer ends to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to the outer part of one of said front gangs and to the inner part of one of said rear gangs for changing the positions of said rear gangs.

9. In a disk harrow, the combination of: a main frame; a rear frame pivoted to said main frame; said rear frame having rearwardly-diagonal upper and lower side bars; front gangs pivoted to said main frame; rear gangs pivoted to said rear frame; means for changing the position of said front gangs; and operating bars each connected to one of said front gangs and one of said rear gangs for changing the positions of said rear gangs, said operating bars extending between said upper and lower side bars.

10. In a disk harrow, the combination of: a main frame; a rear frame pivoted to said main frame, said rear frame having rearwardly-diagonal upper and lower side bars; front gangs pivoted at their inner ends to said main frame; rear gangs pivoted at their outer ends to said rear frame; means for changing the position of said front gangs; and operating bars each connected to one of said front gangs and one of said rear gangs for changing the positions of said rear gangs, said operating bars extending between said upper and lower side bars.

11. In a disk harrow, the combination of: a main frame; a rear frame pivoted to said main frame; said rear frame having rearwardly-diagonal upper and lower side bars; front gangs pivoted to said main frame; rear gangs pivoted to said rear frame; means for changing the position of said front gangs; and operating bars each connected to the outer part of one of said front gangs and to the inner part of one of said rear gangs for changing the positions of said rear gangs, said operating bars extending between said upper and lower side bars.

12. In a disk harrow, the combination of: a main frame; a rear frame pivoted to said main frame, said rear frame having rearwardly-diagonal upper and lower side bars; front gangs pivoted at their inner ends to said main frame; rear gangs pivoted at their outer ends to said rear frame; means for changing the position of said front gangs; and operating bars each connected to the outer part of one of said front gangs and to the inner part of one of said rear gangs for changing the positions of said rear gangs, said operating bars extending between said upper and lower side bars.

13. In a disk harrow, the combination of: a main frame; a rear frame pivoted to said main frame, said rear frame having rearwardly-diagonal upper and lower side bars; front gangs pivoted to said main frame; rear gangs pivoted to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to one of said front gangs and one of said rear gangs for changing the positions of said rear gangs, said operating bars extending between said upper and lower side bars.

14. In a disk harrow, the combination of: a main frame; a rear frame pivoted to said main frame, said rear frame having rearwardly-diagonal upper and lower side bars; front gangs pivoted at their inner ends to said main frame; rear gangs pivoted at their outer ends to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to one of said front gangs and one of said rear gangs for changing the positions of said rear gangs, said operating bars extending between said upper and lower side bars.

15. In a disk harrow, the combination of: a main frame; a rear frame pivoted to said main frame, said rear frame having rearwardly-diagonal upper and lower side bars; front gangs pivoted to said main frame; rear gangs pivoted to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to the outer part of one of said front gangs and to the inner part of one of said rear gangs for changing the positions of said rear gangs, said operating bars extending between said upper and lower side bars.

16. In a disk harrow, the combination of: a main frame; a pivot member pivoted on a vertical axis to said main frame; a rear frame hinged on a horizontal axis to said pivot member; front gangs pivoted to said main frame; rear gangs pivoted to said rear frame; means for changing the position of said front gangs; and operating bars each connected to one of said front gangs and one of said rear gangs for changing the positions of said rear gangs.

17. In a disk harrow, the combination of: a main frame; a pivot member pivoted on a vertical axis to said main frame; a rear frame hinged on a horizontal axis to said pivot member; front gangs pivoted at their inner ends to said main frame; rear gangs pivoted at their outer ends to said rear frame; means for changing the position of said front gangs; and operating bars each connected to one of said front gangs and one of said rear gangs for changing the positions of said rear gangs.

18. In a disk harrow, the combination of: a main frame; a pivot member pivoted on a vertical axis to said main frame; a rear frame hinged on a horizontal axis to said pivot member; front gangs pivoted to said main frame; rear gangs pivoted to said rear frame; means for changing the position of said front gangs; and operating bars each connected to the outer part of one of said front gangs and to the inner part of one of said rear gangs for changing the positions of said rear gangs.

19. In a disk harrow, the combination of: a main frame; a pivot member pivoted on a vertical axis to said main frame; a rear frame hinged on a horizontal axis to said pivot member; front gangs pivoted to said main frame; rear gangs pivoted to said rear frame; a draft frame movable relative to said main frame; latch mechanism for locking said main frame and said draft frame against relative movement, said latch mechanism being operable in a manner to allow a relative movement between said main frame and said draft frame; links connected to said front gangs and said draft frame; and operating bars each connected to one of said front gangs and one of said rear gangs for changing the positions of said rear gangs.

20. In a disk harrow, the combination of: a main frame; a pivot member pivoted on a vertical axis to said main frame; a rear frame hinged on a horizontal axis to said pivot member, said frame having rearwardly diagonal upper and lower side bars; front gangs pivoted to said main frame; rear gangs pivoted to said rear frame; means for changing the position of said front gangs; and operating bars each connected to one of said front gangs and one of said rear gangs for changing the positions of said rear gangs, said operating bars extending between said upper and lower side bars.

In testimony whereof, I have hereunto set my hand at Los Angeles, California, this 21st day of July, 1926.

LOUIS BRENNEIS.